US009873185B2

(12) United States Patent
Goyal et al.

(10) Patent No.: US 9,873,185 B2
(45) Date of Patent: Jan. 23, 2018

(54) RAPID CURING OF RESIN BONDED GRINDING WHEELS

(71) Applicant: Pradeep Metals Limited, Navi Mumbai (IN)

(72) Inventors: Pradeep Goyal, Navi Mambai (IN); Shivanand Borkar, Navi Mumbai (IN); Ritesh Jaiswal, Navi Mumbai (IN)

(73) Assignee: Pradeep Metals Limited, Navi Mumbai (IN)

( * ) Notice: Subject to any disclaimer, the term of this patent is extended or adjusted under 35 U.S.C. 154(b) by 161 days.

(21) Appl. No.: 14/415,074

(22) PCT Filed: Jul. 17, 2013

(86) PCT No.: PCT/IN2013/000445
§ 371 (c)(1),
(2) Date: Jan. 15, 2015

(87) PCT Pub. No.: WO2014/057497
PCT Pub. Date: Apr. 17, 2014

(65) Prior Publication Data

US 2015/0165594 A1 Jun. 18, 2015

(30) Foreign Application Priority Data

Jul. 19, 2012 (IN) ........................ 2443/MUM/2011

(51) Int. Cl.

| | |
|---|---|
| ***B24D 3/00*** | (2006.01) |
| ***B24D 11/00*** | (2006.01) |
| ***B24D 18/00*** | (2006.01) |
| ***C09K 3/14*** | (2006.01) |
| ***B24D 3/02*** | (2006.01) |
| ***B24D 3/28*** | (2006.01) |
| ***H05B 6/64*** | (2006.01) |

(52) U.S. Cl.
CPC .......... *B24D 18/0072* (2013.01); *B24D 3/28* (2013.01); *B24D 18/00* (2013.01); *H05B 6/645* (2013.01)

(58) Field of Classification Search
USPC .......................... 51/295, 293, 298, 307, 309
See application file for complete search history.

(56) References Cited

U.S. PATENT DOCUMENTS

2012/0055100 A1* 3/2012 Yamazoe ................ B24D 3/06 51/309

FOREIGN PATENT DOCUMENTS

DE 4216645 A1 11/1993

OTHER PUBLICATIONS

International Search Report, dated Jan. 27, 2014, issued in International Application No. PCT/IN2013/000445 (5 pages).

* cited by examiner

*Primary Examiner* — James McDonough
(74) *Attorney, Agent, or Firm* — Beem Patent Law Firm

(57) ABSTRACT

A system and process for rapid and uniform curing of grinding wheels (2) to obtain grinding wheels (2) with better durability, at 180-220° C. deploying microwave energy at 800-5000 MHz in which closely fitting green wheel sample holders (1) are made of carbon bearing microwave susceptor materials such as graphite, silicon carbide with tiny holes on the surface. These sample holders (1) help in maintaining the shape and geometry of the final wheels (2) after curing and reduce energy consumption. The performance of the grinding wheels (2) cured by this process is better than those cured by presently used process employing steel plate sample holders of the present state-of-art.

22 Claims, 5 Drawing Sheets

Schematic diagram of the microwave system

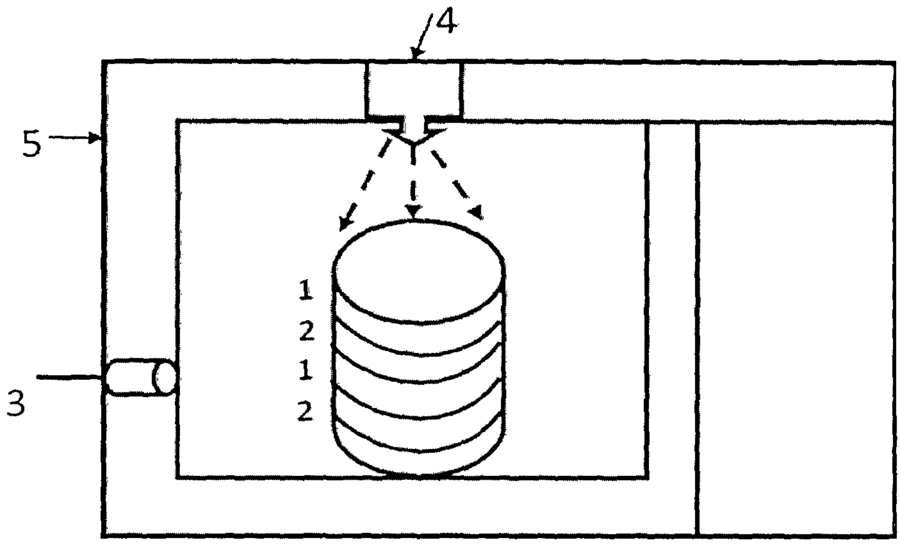
Figure 1: Schematic diagram of the microwave system

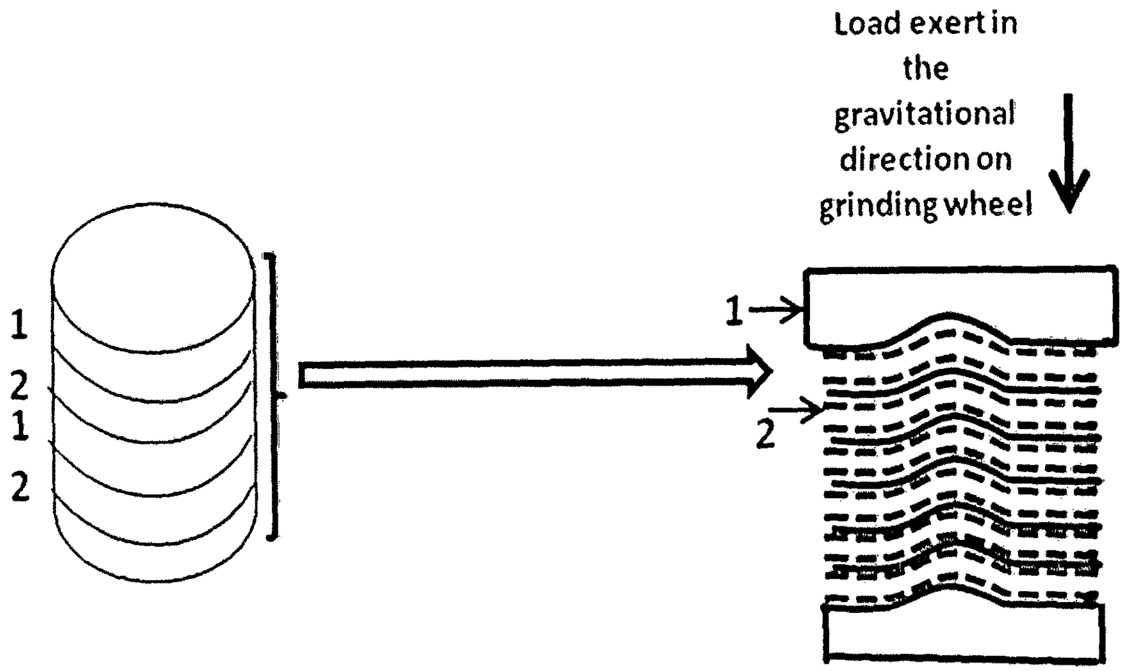
Figure 2: Schematic of the sample and sample holder arrangement

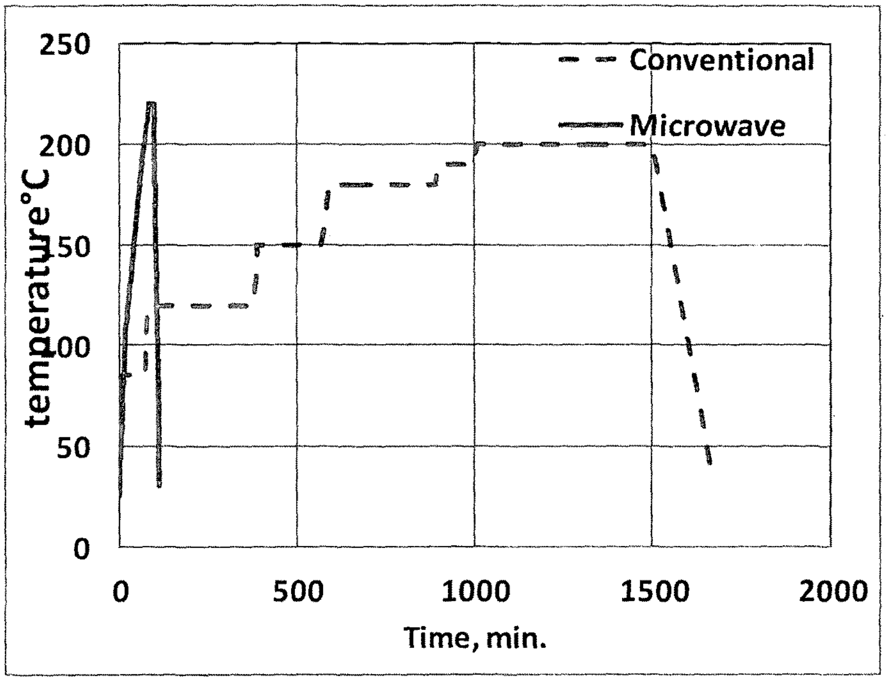
Figure 3: Comparison of Time-Temperature profile of curing depressed center resinoid grinding wheels Microwave Vs Conventional Oven

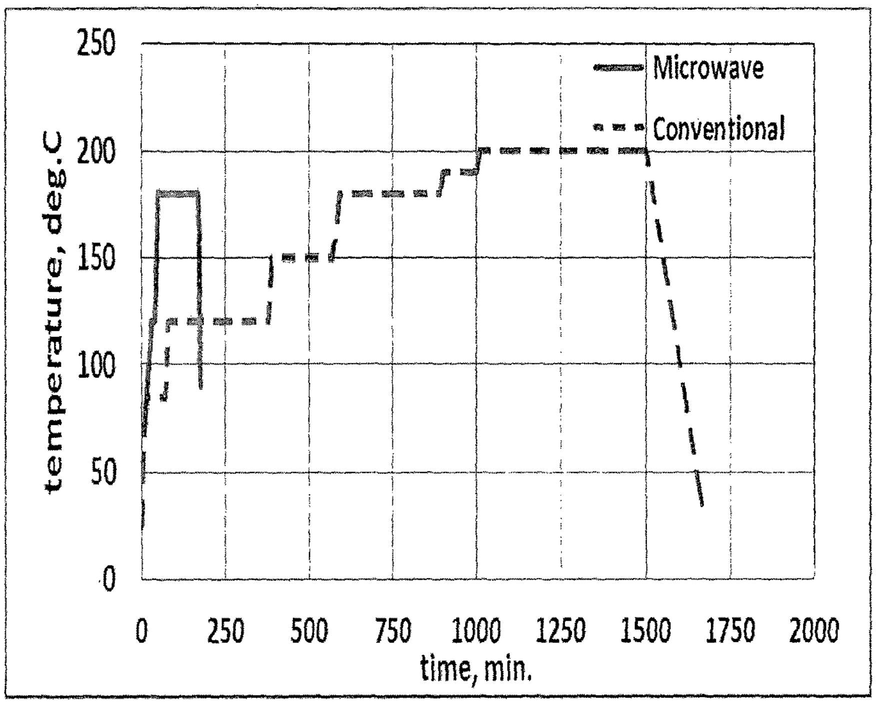
Figure 4: Comparison of Time-Temperature profile of curing cut-off resinoid grinding wheels in Microwave Vs Conventional Oven

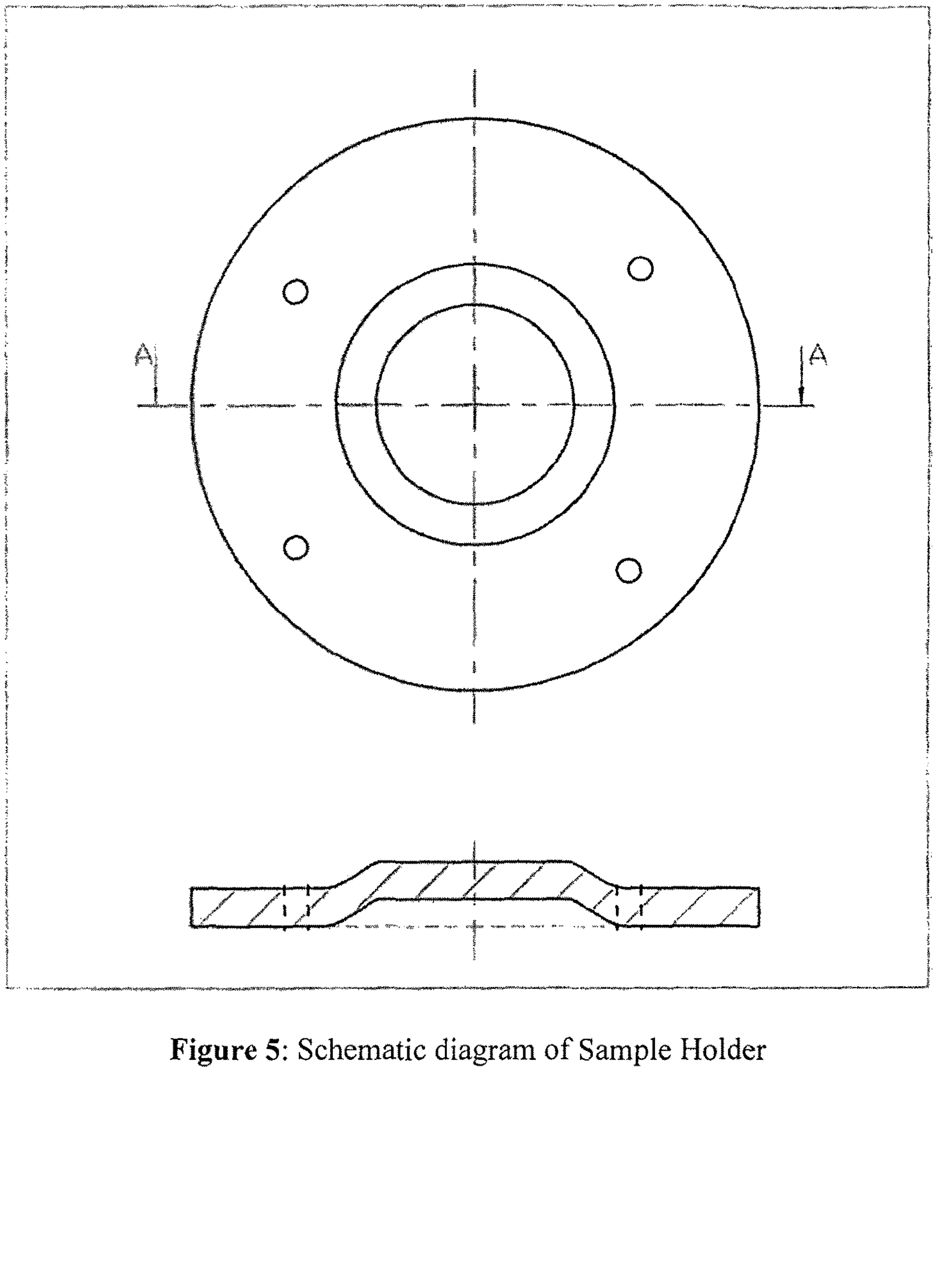
Figure 5: Schematic diagram of Sample Holder

RAPID CURING OF RESIN BONDED GRINDING WHEELS

This application claims benefit of priority from International Patent Application No: PCT/IN2013/000445 filed Jul. 17, 2013 and Indian Patent Application Serial No. 2443/MUM/2011 filed Jul. 19, 2012, both of which are incorporated by reference herein in their entirety.

FIELD OF THE INVENTION

The present invention relates to a system and process for rapid and uniform curing of green grinding wheels.

The invention particularly relates to a system and process for rapid and uniform curing of resin bonded grinding wheels for obtaining grinding wheels with better durability.

The Invention more particularly relates to curing by accelerated heating of resin bonded grinding wheels embedded with/without fiber reinforcement, with the aid of electromagnetic radiations, such as microwaves.

The invention more particularly relates to rapid and uniform curing of resin bonded grinding wheels with the aid of electromagnetic radiations such as microwaves, specifically in the range of 800 to 5000 MHz, more specifically at 2450±50 MHz using pre-designed, customized sample holders made from microwave susceptor materials.

BACKGROUND ART

Grinding wheel is a widely used cutting tool to remove undesired material from work piece by abrasive action. Industrial applications of grinding wheels are: cylindrical grinding, profile grinding, internal grinding, honing and super-finishing, centreless grinding, surface grinding etc. The grinding wheels are typically used in various industries including bearing industries, automobile, defense, foundries, forging industries, steel plants, and machine/cutting tool manufacturing, structural fabrication, etc. Generally, the grinding wheels are used in the entire engineering industry. Efficient grinding wheels should have a high and constant cutting capacity and excellent profile durability.

In the manufacturing of grinding products such as resinoid grinding wheels, which are designed to perform heavy duty tasks such as metal cutting made with an abrasive material which is intimately mixed with the bonding ingredients and temporary binders. The bonding ingredient consists of such compounds as are necessary to combine to form the required resinoid bond during curing. The ingredients are mixed and pressed into the required shape. The green product (green grinding wheel) thus obtained, is then placed in the oven for curing for several hours in order to achieve a slow heating to avoid any damage to the product. Typically in the conventional process, green grinding wheels are cured for several hours ranging from 15-30 hours using radiant heating in electrical or gas fired or oil fired ovens at about 180-220° C. with several intermediate holds at different temperatures, by using radiant heating. During the conventional process of curing, pressure is also employed by inserting metallic plates between the green samples.

The conventional process of curing green grinding wheels requires longer duration heating for achieving desired bond strength between ceramic grains and phenolic resins, as both are bad conductors of heat. This results in spending considerable time and energy to achieve the desired properties.

Thus, there is a need to improve the prior art, by lowering the time and energy required during the conventional process of curing of green grinding wheels.

Prior art teaches various techniques used to lower such time and energy in the process of manufacture of grinding wheels, with the help of use of electromagnetic radiations such as microwave. Examples can be seen as follows:

1) U.S. Pat. No. 5,072,087 claims a process of producing a heat-treated body from a material preferably dielectric ceramic that does not couple well with microwaves at room temperature. However, the invention uses microwave susceptors made from similar material which couples well with microwaves at room temperature and gets converted to substantially the same as the sample material during the microwave heating step. This is done to avoid contamination of the final product.
2) U.S. Pat. No. 4,305,898 discloses a method for the manufacture of a bonded abrasive grinding product using microwave system. The said patent uses a steel or other metallic reinforcing ring in a grinding wheel without it being damaged or destroyed during heating. This process is used only for the manufacturing of swing frame & pedestal grinding wheels where maintaining of profile is not critical as they are flat wheels. Using this process, only a flat and thick swing frame & pedestal wheel can be processed in a single layer only. The limitation of this process is it cannot maintain the critical and complex profile of the wheel after processing and cannot cure grinding wheels in multiple stacking for better economics.
3) U.S. Pat. Nos. 4,150,514 and 4,404,003 disclosed the process in which the mixture was prepared by blending of refractory particles, binder and filler. This mixture was subjected to microwave energy at about 2.45 GHz. This heats the charge to a temperature within the range of about 35-120° C. This is called the preheating process of the grinding wheel mix. Then this preheated mix was transferred to molds which were then placed between the platens of a hot mold press and mold was subjected to pre-curing heating step in accordance with conventional procedures. The curing is done using electrical resistance heating or oil firing or gas firing as per desired time temperature profiles. These patents used the microwave only for the preheating of the mixture which provides fluidization and minimizes the degree of pressure required for the production of any given density of resin-abrasive mixture. The final curing of the grinding wheel was followed by the conventional route.

However, as seen above, these techniques have some limitations in spite of using microwave heating for curing and there is further scope of conserving time and energy.

It is an object of the present invention to carry out the process of curing of green grinding wheels in significantly shortened time period using microwave energy, and consequent reduction in energy consumption.

In the conventional process where curing is done using electrical resistance heating or oil firing or gas firing, a steel plate weighing nearly about 1000 g is used for the curing of single sample each weighing about 90 g to retain the geometry of the samples. This creates nothing but excessive dead load. During the conventional heating process, unnecessary heating of the steel plate and side walls of the furnace/oven also consume disproportionate energy.

The use of such metallic plates during microwave heating may cause reflections of microwaves from the metal plates which may tend to damage the magnetron and there is fear of forming hot spots in the microwave cavity. Therefore, there would be an increased risk of damage to be caused to the magnetron and microwave chamber internally. It would also result in uneven heating of the sample and waste of energy due to reflections.

Thus it is seen that there is a need to improve the prior art by reducing unnecessary and wasteful dead load used in the conventional process of curing and also save the energy wasted in heating the same.

It is clear that a plain substitution of microwave process to the conventional heating process is not the solution to the limitations posed by the prior art.

Further, the sample to be cured needs to be evenly heated with a uniform temperature all over its body for retaining its shape.

The shape of the sample to be cured should not be affected while curing, due to uneven weight load or due to uneven heating.

Thus, there is a need to devise a system for rapid and uniform curing of grinding wheels which steers away from the limitations noted above, and achieves the intended objects.

OBJECT OF THE INVENTION

It is an object of the present invention to provide rapid and uniform curing of resin bonded grinding wheels using microwaves which obviates the drawbacks of the hitherto known prior art as detailed above.

It is another object of the present invention to cure the grinding wheels rapidly and uniformly and produce the finished product with acceptable and desired physical properties, in an energy-efficient, economical and safe way.

It is yet, another object of the present invention to obtain a product that gives better performance in its use and is more durable as compared to products cured using the conventional processes.

SUMMARY OF THE INVENTION

The present invention provides a system for rapid and uniform curing of grinding wheels, comprising a. green samples of grinding wheels,
b. microwave cavity,
c. pre-designed and customized sample holders made from microwave susceptible materials and having an identical profile as that of the said green samples of grinding wheels,
d. temperature sensor, and
e. means to control the temperature of the sample within the microwave cavity.

The susceptible material used for the sample holders is a carbon bearing material, more preferably graphite.

The present invention also provides a process for rapid and uniform curing of green grinding wheels, comprising a. preparing the sample holders such that the green samples of grinding wheels which are to be uniformly cured, fit snugly in the sample holders; holding the green samples of grinding wheels in the sample holders prepared;
b. placing the sample holders with the green samples in the microwave cavity; stacking more sample holders with green samples in them, if necessary;
c. deploying microwave energy for a predetermined time to attain the desired temperature as required for the green samples placed between the sample holders which are kept in the microwave cavity for curing;
d. removing the sample holders along with the cured grinding wheels from the microwave cavity and separating the uniformly cured grinding wheels from the sample holders.

The system and the process are preferably used for curing of resin bonded grinding wheels.

The use of pre-designed, customized sample holders made from microwave susceptor materials in the curing process of grinding wheels with microwave energy, provides the necessary objectives, viz.

a) while they function as separators of green grinding wheel samples to be cured; they absorb microwaves effectively and efficiently and in turn heat the green grinding wheels volumetrically and rapidly during the curing process;
b) they act as a load to press the green samples during curing; and also enable to maintain the shape and profile of the grinding wheel during the curing process.
c) The graphite holders of 5 to 15 mm thickness have tiny holes covering the entire surface of the holder which help in the easy escape of volatiles and other gases which are generated during the curing process. Thereby the time taken for curing the grinding wheel sample is reduced drastically, and uniform curing of the sample is also achieved. Because of the tight fitting of the samples in the sample holder, the product is well compacted and the uniform curing all around gives a product whose performance is better than that of the grinding wheels cured using the conventional processes.

The sample holders are preferably made of microwave susceptor material such as graphite, and are predesigned and customized according to the desired shape, geometry and profile of the finished product, whereby rapid and uniform curing of resin bonded grinding wheels is achieved. Use of the microwave energy further saves time and resources. After the curing process, sample holders are separated from the product and used for the next batch. Reuse of the sample holders number of times reduces the cost of the process.

DETAILED DESCRIPTION OF THE INVENTION

In the system and process of rapid and uniform curing of grinding wheels of the present invention, the sample holders are made from microwave susceptible materials selected from carbon bearing materials such as silicon carbide, zirconia based materials, ferrites or graphite. Graphite is the most preferred material.

In the system and process of rapid and uniform curing of grinding wheels of the present invention, the microwave cavity is arranged to provide microwaves in the frequency range of 800-5000 MHZ, preferably 890-2450 MHz and more preferably at 2450±50 MHz.

Microwave technique is an internal heating process where the heat is generated by interaction of electromagnetic waves with the material at the atomic level. The microwave heating process is also known as dielectric heating. As the microwaves interact with the sample, they cause rapid oscillation of the dipoles of the molecules of the constituents such as ceramic grains and organic binders, causing intermolecular friction. Due to this inter-molecular friction, heat is generated very rapidly, resulting in heating the sample volumetrically and uniformly. The volumetric heating equilibrates the reaction kinetics and forms bonding rapidly. As a result the intermediate soaking steps of the conventional process are minimized or completely eliminated.

Ceramic grains generally used are made from alumina or silicon carbide having different grit sizes which decides its end application. However, the experiments conducted during this invention use grinding wheels with 24 grit size alumina. Organic binders such as phenolic resins or epoxy resins or urethane resins are used for binding the abrasive ceramic grains.

In the present invention, the microwave heating system installed with infrared temperature sensor and the temperature controller is of prime importance to control the sample temperature.

In the present invention, green resinoid grinding wheels are stacked suitably in the pre-designed and customized sample holders made from machinable susceptor material such as graphite, which is a good absorber of microwaves. These are placed in the microwave cavity in such a way as to get uniform exposure in the microwave field at 2.45 GHz. Another component of our system; an infrared temperature sensor is focused on the sample for monitoring and controlling the temperature, and maintaining a typical heating profile of the grinding wheels during the curing process. The infrared sensors can be replaced by thermocouples with proper design and arrangement. Samples are heated as per heating profile in the microwave cavity. The total time taken for curing is significantly lower as compared to the conventional method, wherein the samples are stacked in the microwave cavity and separated by steel plates.

The sample holders in one embodiment of our invention, for curing green resinoid grinding wheels are pre-designed, customized and made of graphite. They not only aid as the lender of support to the samples, but also play an important role in maintaining the shape and size of the grinding wheel. After considerable experimentation, we have come to the present manner of preparation of snugly fitting sample holders concomitant with the apparatus and the process. The present invention not only leads to significant reduction in the energy consumption by reducing the curing time for grinding wheels, but also retains the desired shape and geometry of the grinding wheels after curing. The present invention also leads to enhancement in the performance of the grinding wheels.

BRIEF DESCRIPTION OF THE DRAWINGS

FIG. 1 represents schematic diagram of the microwave system.

FIG. 2 represents schematically the sample and sample holder arrangement.

FIG. 3 represents comparison of Time-Temperature profile of curing depressed center resinoid grinding wheels: Microwave versus Conventional Oven.

FIG. 4 represents comparison of Time-Temperature profile of curing cut-off resinoid grinding wheels: Microwave versus Conventional Oven.

FIG. 5 represents schematic diagram of sample holder

DETAILED DESCRIPTION OF THE DRAWINGS

As required, details of one embodiment of the present invention are disclosed herein. However, it is to be understood that disclosed are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In the present invention, green resinoid grinding wheel samples 2 are stacked suitably in the predesigned sample holders 1 made from susceptor material such as graphite as shown in FIG. 5, which is a good absorber of microwaves at room temperature, which describes a typical schematic diagram of a graphite sample holder for 100 mm diameter depressed/depressed center resinoid grinding wheel (DP). The sample holder 1 and green grinding wheel 2 are stacked alternately one above the other as shown in FIG. 2. The green grinding wheel sample 2 is always pressed between sample holders 1 which apply the load in the gravitational direction required for maintaining the desired profile of the grinding wheel sample 2 during curing. These are placed in the microwave cavity 5 as shown in FIG. 1, in such a way as to get uniform exposure in the microwave field at 2.45 GHz. A microwave inlet 4 is provided in the microwave cavity 5. An infrared temperature sensor 3 is focused on the grinding wheel sample 2 for monitoring and controlling the temperature, and a typical heating profile for depressed and cut-off resinoid grinding wheels are shown in FIG. 3 and FIG. 4 respectively. The total time taken for the curing is significantly lower compared to the conventional method as shown in FIG. 3 and FIG. 4. It will be clear from these drawings that the tiny holes in the walls of the graphite sample holders help the easy escape of volatiles and other gases generated during the curing process thereby giving uniform temperature and uniform curing of the grinding wheels.

The invention describes the heating i.e. curing of resin bonded grinding wheels by electromagnetic radiation (EMR) such as microwaves, by using a susceptor 1 material which is a good absorber of microwaves even at room temperature. The susceptor 1 material selected in the invention is graphite, which can be machined in pre-designed shapes and profiles of the grinding wheel samples 2. There are alternatives for graphite, such as silicon carbide, zirconia based materials, and ferrites etc. But, these alternatives have inherent problem as the machining of these ceramic susceptor materials is difficult. They need to be either pressed or casted in the desired shape and then sintered to high temperature to attain the strength and geometry. Therefore, the material used in this invention is graphite which is easily machinable. The multiple roles of graphite in this invention are: a) susceptor for initial heating of grinding wheels, b) sample holder and separator, c) load and pressure provider to maintain the final shape and geometry of the grinding wheels, d) absorber of the reflected microwaves from the metallic ingredients present in the grinding wheels and e) ease of drilling tiny holes in the desired pattern to allow easy escape of volatiles and other gases generated, during the curing.

As mentioned earlier, the selection of graphite of standard quality as the susceptor 1 material for the preparation of sample holders of the present invention makes it easy to machine for arriving at the precise dimensions to tightly cover the entire green sample in its final size and shape. The weight of the sample holder for curing the depressed resinoid grinding wheels is only 10-40% of the weight of the steel sample holders used during the conventional curing processes using electrical or gas fired or oil fired systems. This reduced weight of the sample holder holds true to exert the desired load in the gravitational direction as shown in FIG. 2 for maintaining the profile of the grinding wheel sample 2 after curing. This load allows the mesh made of plastic or metal to enter uniformly in the matrix and strengthening or fiber reinforcement of the grinding wheel sample 2. The sample holder 1 made of graphite used in this invention exhibits good absorbing characteristics for microwave radiation even at room temperature, thereby absorbing part of the microwave energy to increase its temperature, when placed in the microwave cavity 5.

It is important to maintain the microwave cavity/sample holder/sample temperature in the range of 150-250° C. The most preferred temperature range is 180-220° C. depending on the shape, size and composition of the grinding wheel sample 2. This helps in uniform curing of the green grinding wheel sample 2.

In the conventional process, a steel plate weighing about 1000 g is used for the curing of single sample weighing about 90 g to retain the geometry of the grinding wheel sample 2. But in the present invention, susceptor plate made of graphite, weighing about 100-400 g was employed thereby reducing the dead load by about 90 to 60%. During the conventional heating process, unnecessary heating of the steel plates consumes disproportionate energy which is reduced drastically by the employment of light weight susceptor which works as an active heater under electromagnetic field. The function of graphite in this invention is also to absorb any reflected microwaves from the metallic components present in the green grinding wheel sample 2 to avoid reflection of microwaves going to the magnetron, for its protection. It also exerts the desired pressure on the green grinding wheel sample 2 that enables the fiber reinforcement to penetrate in the matrix to bond the matrix, thereby achieving the desired strength and geometry. The active participation of the sample holders 1 during microwave curing helps in drastic reduction of total time required for curing of resinoid grinding wheels compared to the conventional processing in an electric or gas or oil fired heating systems with metal separators as shown in FIG. 3 and FIG. 4. In the present invention, drying of green grinding wheel samples 2 before curing is not required thereby making the entire process much simpler and faster.

Processing conditions of depressed (DP) and cut-off (C) grinding wheels are given below in Table I

TABLE I

Typical processing conditions for processing of single depressed (DP) and cut-off (C) wheels in laboratory microwave system

| Process | Type of sample | Curing temperature | Total time (min.) |
|---|---|---|---|
| Microwave | Depressed Resinoid | 180-220 | 90-120 |
| | Cut-off Resinoid | 180-200 | 90-120 |
| Conventional | Depressed Resinoid | 180-200 | 900-1800 |
| | Cut-off Resinoid | 180-200 | 900-1200 |

The temperature and time vary depending upon the shape, size and composition of the green grinding wheels.

EXAMPLES

The invention is now described by way of examples.

Many modifications in addition to those describes above may be made to the technique described herein without departing from the spirit and scope of the invention. Accordingly, following are examples only and or not limiting of the scope of the invention.

Example 1

A green compact sample of depressed resinoid grinding wheel (DP1), 100 mm diameter, 5 mm thick and 15 mm hole diameter, weighing 90 g was placed between 12 mm thick graphite susceptors weighing 200 g each. The graphite sample holders were made to hold the samples of green grinding wheels to fit snugly in the sample and with tiny holes in the walls of the susceptors. These green grinding wheels consisting of alumina grains mixed with phenolic resins and fillers were cured at 220° C. in 700 W microwave system within 90 minutes.

The microwave cured sample (MW-DP1) of the grinding wheel thus produced above was evaluated for Metal Removal Rate (MRR) and G-Ratio i.e. durability. For this purpose, cured grinding wheel is mounted on a lathe machine installed with electrical motor that delivers 6200 rpm to the 5 mm thick depressed resinoid grinding wheel of 100 mm diameter. Trial was conducted on 28 mm dia., 338 mm long C22.8 grade carbon steel rod weighing 1.6 kg. The carbon steel rod was mounted on the lathe and by adjusting auto motor travel settings maintained uniform travel speed of the wheel with a constant rate in a forward direction giving a cut of about 1 mm on the rotating carbon steel rod. The duration of cutting was 30 min. for both microwave cured wheel (MW-DP1) and commercial grinding wheel (S1). After completion of 30 min., the rod was removed from the lathe and its final dimensions and weight were noted. Similarly, the change in the diameter and weight of grinding wheel were noted. Simultaneously, a commercial sample (S1) of depressed grinding wheel prepared by the conventional process using steel plate as the sample holder was similarly tested for metal removal rate and G-ratio estimation. Results are listed below in tabular form in the following Table II:

TABLE II

Data collected for MRR during trial of the depressed (DP) resinoid grinding wheel (cut of about 1 mm)

| | MW-DP1 | Commercial grinding wheel(S1) |
|---|---|---|
| Initial dia. of steel rod ($D_{ir}$, mm) | 28.4 | 28.4 |
| Final dia. of steel rod ($D_{fr}$, mm) | 27.3 | 27.6 |
| Initial dia. of wheel ( $D_{iw}$, mm) | 100.5 | 99.96 |
| Final dia. of wheel ( $D_{fw}$, mm) | 100.34 | 99 |
| Initial wt. of steel rod ($W_{ir}$, g) | 1634 | 1608 |
| Final wt. of steel rod ($W_{fr}$, g) | 1608 | 1590 |
| Initial wt. of wheel ( $W_{iw}$, g) | 98.62 | 97.17 |
| Final wt. of wheel ($W_{fw}$, g) | 98.3 | 96.69 |
| Initial vol. of steel rod ($V_{ir}$, $mm^3$) | 214004 | 214004 |
| Final vol. of steel rod ($V_{fr}$, $mm^3$) | 209772 | 210379 |
| Initial vol. of wheel ($V_{iw}$, $mm^3$) | 39643 | 41963 |
| Final vol. of wheel ($V_{fw}$, $mm^3$) | 39517 | 41161 |

MW-DP1 = experimental sample of example 1 microwave cured depressed resinoid grinding wheel.
S1 = commercial sample of depressed grinding wheel (DP) prepared by the conventional process using steel plates as sample holders.

Using the standard formula i & ii mentioned below, the Metal Removal Rate (MRR, $mm^3$/min.) and G-Ratio (durability) i.e. the ratio of metal volume removed to volume of wheel consumed was estimated and the results are given in Table III.

$$\text{Metal Removal Rate (MRR)}=(V_{ir}-V_{fr})/T \quad \text{(i)}$$

Where, $V_{ir}$—Initial volume of the rod, $V_{fr}$—Final volume of the rod, T—Time (min.)

$$G\text{-Ratio}=(V_{ir}-V_{fr})/(V_{iw}-V_{fw}) \quad \text{(ii)}$$

Where, $V_{iw}$—Initial volume of the grinding wheel, $V_{fw}$—Final volume of the grinding wheel

TABLE III

| Performance comparison at 6200 rpm (cut of about 1 mm) | | |
|---|---|---|
| Wheel | MRR ($mm^3$/min) | G-Ratio |
| MW-DP1 | 141.1 | 33.6 |
| Commercial (S1) | 120.8 | 4.5 |

The results as shown above in Table III demonstrate that MRR and G-Ratio values of MW cured (MW-DP1) grinding wheel are better than the commercial grinding wheels (S1) when they are compared after grinding for 30 min. at 6200 rpm.

Example 2

Another depressed resinoid grinding wheel (DP2) produced by above invented method as described in example 1 was used for cutting metal and for this purpose was mounted on a lathe machine installed with electrical motor that delivers 11500 rpm to the depressed resinoid grinding wheel of 100 mm diameter. Trial was conducted on 28 mm dia., 338 mm long C22.8 grade carbon steel rod weighing 1.6 kg. The carbon steel rod was mounted on the lathe and by adjusting auto motor travel settings maintained uniform travel speed of the wheel with a constant rate in a forward direction giving a cut of about 1 mm on the rotating carbon steel rod. The duration of cutting was 30 min. for both microwave cured wheel (MW-DP2) and commercial grinding wheel. After completion of 30 min., the rod was removed from lathe and its final dimensions, and weight was noted. Similarly the change in the diameter and weight of grinding wheel was noted. From the data and using the standard formula i & ii mentioned above in example 1, the Metal Removal Rate (MRR, $mm^3$/min.) and G-Ratio i.e. the ratio of metal volume removed to volume of wheel consumed was estimated.

Results are shown below in Table IV

TABLE IV

| Performance comparison at 11500 rpm | | |
|---|---|---|
| Wheel | MRR ($mm^3$/min) | G-Ratio |
| MW-DP2 | 169.2 | 72.5 |
| Commercial (S2) | 164.7 | 11.8 |

MW-DP2 = microwave cured sample of depressed resinoid grinding wheel
S2 = commercially available sample prepared by conventional process using steel plates as sample holders.

The results as shown above in Table IV demonstrate that MRR and G-Ratio values of MW cured (MW-DP2) grinding wheels are better than those of the commercial grinding wheels (S2) when they are compared after grinding for 30 min. at 11500 rpm.

The results as, shown above in Table III and Table IV show that microwave cured depressed (DP) grinding wheels of this invention perform with better durability (G-ratio) at both high and low cutting rates compared with the conventionally cured commercial grinding wheel with the same composition.

Example 3

Another depressed resinoid grinding wheel (MW-DP3a) produced by above invented method as described in example 1 was used for cutting metal and for this purpose was mounted on a lathe machine installed with electrical motor that delivers 11500 rpm to the depressed resinoid grinding wheel of 100 mm diameter. Trial was conducted on C22.8 grade carbon steel rod with diameter 25 mm. The carbon steel rod was mounted on the lathe and by adjusting auto motor travel settings maintained uniform travel speed of the wheel with a constant rate in a forward direction giving a cut of about 2 mm on the rotating carbon steel rod. The duration of cutting was 30 min. for both microwave cured wheel (MW-DP3a) and commercial grinding wheel (S3). After completion of 30 min., the rod was removed from lathe and its final dimensions, and weight was noted. Similarly the change in the diameter and weight of grinding wheel was noted. From the data and using the standard formula i & ii mentioned above in example 1, the Metal Removal Rate (MRR, $mm^3$/min.) and G-Ratio i.e. the ratio of metal volume removed to volume of wheel consumed was estimated.

Results are shown below in Table V

TABLE V

| Performance comparison at 11500 rpm (cut of about 2 mm) | | |
|---|---|---|
| Wheel | MRR ($mm^3$/min) | G-Ratio |
| MW-DP3a | 681.8 | 197.6 |
| Commercial (S3) | 701.9 | 36.9 |

MW-DP3a = microwave cured sample of depressed resinoid grinding wheel
S3 = commercially available sample prepared by conventional process using steel plates as sample holders.

The results as shown above in Table V show that by increasing the cut from 1 mm to about 2 mm on the rotating carbon steel rod, G-Ratio value of MW cured (MW-DP3a) grinding wheels is better than that of the commercial grinding wheels (S3) when they are compared after grinding for 30 min. at 11500 rpm.

Example 4

To check the reproducibility of the batch process for depressed resinoid grinding wheels (DP) using microwave technique, few more batch trials were conducted during which more than one sample was processed by stacking green grinding wheels one over other in nos. 2, 3, 5 per batch (MW-DP3a, MW-DP3b, MW-DP4a, MW-DP4b, MW-DP 5a, MW-DP5b, MW-DP5c, MW-DP5d, MW-DP5e respectively). From these batches, a sample was subjected for performance testing on C22.8 grade carbon steel rod with diameter in the range of 25-32 mm and adjusting cut of about 2 mm and compared with the different commercial resinoid grinding wheels of the same type available in the local market (S3-S10). Data of these testing is given below in Table VI.

TABLE VI

| Repeatability of the process (cut of about 2 mm) | | | |
|---|---|---|---|
| Wheel | Cutting time (min.) | MRR ($mm^3$/min.) | G-Ratio |
| MW-DP3a | 30 | 681.8 | 197.6 |
| MW-DP3b | 30 | 641.7 | 202.8 |
| Commercial (S3) | 30 | 701.9 | 36.9 |
| Commercial (S4) | 30 | 695.2 | 32.9 |
| MW-DP4a | 60 | 723.7 | 82.9 |
| MW-DP4b | 60 | 847.7 | 116.0 |

TABLE VI-continued

Repeatability of the process (cut of about 2 mm)

| Wheel | Cutting time (min.) | MRR ($mm^3$/min.) | G-Ratio |
|---|---|---|---|
| Commercial (S5) | 60 | 719.6 | 19.4 |
| MW-DP5a | 60 | 774.8 | 103.7 |
| MW-DP5b | 60 | 855.8 | 79.2 |
| MW-DP5c | 60 | 859.8 | 99.3 |
| MW-DP5d | 60 | 859.8 | 117.2 |
| MW-DP5e | 60 | 875.8 | 141.6 |
| Commercial (S6) (100 × 4 × 16) | 60 | 719.8 | 19.4 |
| Commercial (S7) (100 × 4 × 16 A24SB) | 60 | 835.6 | 36.1 |
| Commercial (S8) (100 × 4 × 16) | 60 | 859.8 | 35.7 |
| Commercial (S9) (100 × 4 × 16 A24R) | 60 | 837.7 | 47.3 |
| Commercial (S10) (100 × 4 × 16 A36PBF) | 60 | 827.6 | 45.1 |

S6-S10 = Commercial samples procured from the market manufactured by reputed manufacturers with their standard specifications mentioned for each of these samples

Example 5

For performance checking, microwave cured cut-off resinoid grinding wheel (C1) of 65 mm diameter and thickness of around 10 mm was mounted on a lathe machine and tested for 30 min giving a cut of about 2 mm on a rotating carbon steel rod. The duration of this was 30 min. for both microwave cured (MW-C1) and commercial resinoid cut-off grinding wheel (CS1). After completion of 30 min., the grinding wheel was removed from lathe and its final dimensions, and weight was noted. Results are given in Table VII.

TABLE VII

Performance comparison at 11500 rpm (cut of about 2 mm)

| Wheel | Cutting time (min.) | MRR ($mm^3$/min.) | G-Ratio |
|---|---|---|---|
| MW-C1 | 30 | 396.4 | 32.2 |
| Commercial (CS11) | 30 | 388.1 | 23.9 |

MW-C1 = experimental sample of example 4, microwave cured cut-off resinoid grinding wheel
CS11 = Commercial sample of Cut-off grinding wheel.

Advantages of the Present Invention

1) The invented system discloses the use of pre-designed and customized sample holders that
   a. lead to reduction in the dead load giving increased heat efficiency
   b. absorb the microwaves even at room temperature and heats up and on continuous heating by the microwave raises the temperature of the grinding wheels
   c. retain the shape of the cured grinding wheels
   d. cause uniform and volumetric heating that gives better bond strength to the grinding wheel on curing
   e. are light in weight, hence consume lesser energy to heat the sample and avoid wastage of heat
2) This invented process is simple, affordable and economical.
3) In the invented process grinding wheel is rapidly, volumetrically and selectively heated by microwave, thereby requiring much less time for curing.
4) The present process maximizes the utilization of electromagnetic energy such as microwave by using the pre-designed microwave susceptor.
5) The present process provides better properties of the final product such as Metal Removal Rate (MRR) and G-ratio i.e. durability.
6) In conventional curing metallic plates are used as separators and load for retaining the shape of the wheel. In the invented process the input energy is utilized only for heating the desired material due to drastic reduction in the unnecessary dead load of the metallic plate placed as separators and replaced by thin lightweight materials.
7) In the invented process, by using sample holders made from microwave susceptor materials, the reflected microwaves from the metallic ingredients present in the grinding wheel are absorbed by the sample holders, thereby enhancing the energy efficiency.
8) The present novel invented process uses a simple design with huge economic benefits.

While the invention has been described, disclosed, illustrated and shown in certain terms or embodiments or modifications which has been undertaken practically, the scope of the invention is not intended to be nor should it be deemed to be limited thereby and such other modifications or embodiments as may be suggested and teachings herein are particularly reserved especially as they fall within the breadth and scope of the claims here appended. The preferred form of this invention has been described above. It is possible that modifications thereof may occur to those skilled in the art which will fall within the scope of the following claims.

We claim:

1. A system for rapid and uniform curing of grinding wheels for obtaining grinding wheels, comprising
a. a plurality of green samples of grinding wheels,
b. a microwave cavity,
c. a plurality of sample holders made from materials susceptible to microwaves at room temperature, each sample holder having a substantially identical profile as a corresponding one of the green samples of grinding wheels,
d. a temperature sensor, and
e. a temperature controller for controlling the temperature of the sample within the microwave cavity.

2. The system as claimed in claim 1, wherein the grinding wheels are resin bonded.

3. The system as claimed in claim 1, wherein the materials susceptible to microwaves are selected from carbon bearing material.

4. The system as claimed in claim 3, wherein the materials susceptible to microwaves are graphite.

5. The system as claimed in claim 3, wherein the sample holders have holes on a surface.

6. The system as claimed in claim 1, wherein the microwave cavity provides microwave radiations in the frequency range of 800-5000 MHz.

7. The system as claimed in claim 6, wherein the microwave cavity provides microwave radiations in the frequency range of 890-2450 MHz.

8. The system as claimed in claim 6, wherein the microwave cavity provides microwave radiations in the frequency range of 2450+/−50 MHz.

9. The system as claimed in claim 1, wherein the microwave cavity provides microwave radiations in either a continuous manner, a pulsed manner, or both.

10. The system as claimed in claim 1, wherein the temperature controller maintains a temperature in the range of 180-220° C. based on the shape, size and composition of the grinding wheel.

11. A process for rapid and uniform curing of green grinding wheels for obtaining grinding wheels, comprising a. preparing a sample holder such that a green sample of a grinding wheel to be cured fits snugly in the sample holder, the sample holder made from materials susceptible to microwaves at room temperature;

b. placing the green sample in the sample holder;

c. placing the sample holder with the green sample in the microwave cavity;

d. stacking one or more additional sample holders with additional green samples in them, if necessary;

e. deploying microwave energy for a predetermined time to attain a desired temperature as required for at least partially curing the green samples;

f. removing the sample holder(s) along with the cured grinding wheel(s) from the microwave cavity and separating the cured grinding wheels from the sample holder(s) for reuse.

12. The process as claimed in claim 11, wherein the green samples are of resin bonded grinding wheels.

13. The process as claimed in claim 11, wherein the sample holders are prepared from carbon bearing material.

14. The process as claimed in claim 13, wherein the sample holders are prepared from graphite.

15. The process as claimed in claim 13, wherein the sample holder(s) have holes on the surface.

16. The process as claimed in claim 11, wherein the microwave energy deployed is of 800-5000 MHz.

17. The process as claimed in claim 16, wherein the microwave energy deployed is of 890-2450 MHz.

18. The process as claimed in claim 16, wherein the microwave energy deployed is of 2450+/−50 MHz.

19. The process as claimed in claim 11, wherein the green samples of grinding wheels are heated in the microwave cavity in the range of 180-220° C.

20. The process as claimed in claim 19, wherein the green samples are heated in the microwave cavity at about 220° C. or less.

21. The process as claimed in claim 11, wherein the green sample is a depressed resinoid grinding wheel of 100 mm diameter, 5 mm thick and 15 mm hole diameter, weighing about 90 g and consisting of alumina grains mixed with phenolic resin and fillers, where the sample holder includes at least two about 12 mm thick graphite susceptors weighing about 200 g each and, where the sample is cured at about 220° C. in a 700 W microwave system for about 90 minutes to obtain a substantially uniformly cured depressed resinoid grinding wheel.

22. The process as claimed in claim 15, where the sample holder allows part of the microwaves to impinge directly on the green sample held in it.

* * * * *